(12) United States Patent
Kallioniemi et al.

(10) Patent No.: US 8,054,019 B2
(45) Date of Patent: Nov. 8, 2011

(54) METHOD AND APPARATUS FOR CONTROLLING A MOTOR

(75) Inventors: Antti Kallioniemi, Jokela (FI); Lauri Stolt, Helsinki (FI); Tuukka Kauppinen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 241 days.

(21) Appl. No.: 12/488,937

(22) Filed: Jun. 22, 2009

(65) Prior Publication Data

US 2009/0322273 A1 Dec. 31, 2009

Related U.S. Application Data

(63) Continuation of application No. PCT/FI2008/000003, filed on Jan. 15, 2008.

(30) Foreign Application Priority Data

Jan. 24, 2007 (FI) ...................................... 20070065

(51) Int. Cl.
 *H02H 7/09* (2006.01)

(52) U.S. Cl. .................... 318/400.22; 318/503; 318/606

(58) Field of Classification Search ............. 318/400.22, 318/503, 606, 609, 599; 388/806, 801, 803; 363/37
See application file for complete search history.

(56) References Cited

U.S. PATENT DOCUMENTS

| 4,096,558 A | 6/1978 | Jensen |
| 2002/0175649 A1* | 11/2002 | Reutlinger .................... 318/609 |
| 2006/0267515 A1 | 11/2006 | Burke et al. |

FOREIGN PATENT DOCUMENTS

| EP | 1 174 898 A1 | 1/2002 |
| EP | 1 174 998 A1 | 1/2002 |
| EP | 1 727 267 A2 | 11/2006 |
| GB | 2 086 102 A | 5/1982 |
| JP | 5-184188 A | 7/1993 |
| JP | 2000-316291 A | 11/2000 |

* cited by examiner

*Primary Examiner* — Karen Masih

(74) *Attorney, Agent, or Firm* — Birch, Stewart, Kolasch and Birch, LLP (57) ABSTRACT

The invention concerns a method and an apparatus for controlling a three-or-more-phase motor driven by a frequency converter. In the method, a change-over switch of the frequency converter is controlled to a continuously conducting state and at the same time the phase voltages or phase currents of the other phases are controlled by switching the change-over switches in those motor phases at a switching frequency substantially higher than the frequency of the fundamental wave of the phase voltage or phase current. The apparatus comprises in conjunction with the frequency converter a number of change-over switches, at least one change-over switch for each motor phase. The change-over switches comprise controllable change-over contacts. The apparatus further comprises in conjunction with the frequency converter means for determining the motor phase currents and means for controlling the change-over contacts.

20 Claims, 4 Drawing Sheets

6: means for controlling the change-over contacts
7: phase current reference
11: pulse width modulator
21: means for controlling the phase switches
23: means for controlling the phase currents

11: pulse width modulator
18: element for determining the absolute value
19: comparator
20: control stage
28: motor phase currents

METHOD AND APPARATUS FOR CONTROLLING A MOTOR

This application is a Continuation of copending PCT International Application No(s). PCT/FI2008/000003 filed in Finland on Jan. 15, 2008, which designated the United States, and on which priority is claimed under 35 U.S.C. §120. This application also claims priority under 35 U.S.C. §119(a) on Patent Application Nos. FI20070065 filed in Finland on Jan. 24, 2007. The entire contents of each of the above documents is hereby incorporated by reference.

FIELD OF THE INVENTION

The present invention relates to a method as defined in the preamble of claim 1 and to an apparatus as defined in the preamble of claim 8 for controlling a motor.

PRIOR ART

Using modern frequency converters, a magnetic flux varying as a function of time is generated in the air gap of a motor to rotate the motor by feeding a sinusoidal current into the motor windings. The sinusoidal current varying as a function of time makes up a rotating current vector. The rotating current vector produces a magnetic flux in the air gap of the motor. The current in the windings is controlled by connecting the change-over contacts of a change-over switch of the frequency converter alternately to the positive and negative voltage potentials of a direct-voltage intermediate circuit. The change-over contacts are switched at a frequency substantially higher than that of the fundamental wave of the sinusoidal current.

The change-over switches used in a frequency converter are generally semiconductors, such as IGBT transistors. In semiconductors like these, losses are produced, which can be divided into conduction losses and switching losses. Conduction losses occur when a current is flowing through a conducting semi-conductor. Switching losses again are produced in connection with the switching action of the semiconductor, both when the semiconductor is being turned to the conducting state and when it is being turned off. Switching losses increase as a function of the switching frequency, in such manner that in the case of many IGBT transistor types the conduction and switching losses equal each other at a switching frequency of about 10 kiloherz. When the semiconductor is continuously in the conducting state, only conduction losses are produced. Both conduction and switching losses increase with increasing current. The current capacity of an IGBT transistor, besides being dependent on the magnitude of the current flowing through the transistor, also depends on the switching frequency at which the transistor is switched. Furthermore, the current capacity depends on the cooling of the transistor, i.e. on the efficiency of removal of power losses produced from the transistor.

As improving the cooling efficiency requires the addition of auxiliary equipment, such as heat sinks, fans or water cooling devices, in connection with the heat developing semi-conductors, this involves additional costs while at the same time increasing the size of the frequency converters. Power losses can be reduced by using semiconductors designed for larger currents, but this also involves additional costs. For this reason, efforts have been made to develop different switching techniques applicable for reducing the power losses while simultaneously increasing the current range of the transistor.

Specification U.S. Pat. No. 4,096,558 discloses a method wherein a change-over contact, such as a thyristor or IGBT transistor, of a frequency converter is held continuously in the conducting state for a predetermined period of time during each half-cycle of the sinusoidal fundamental wave of the phase voltage of the frequency converter. During the rest of the half-cycle, the switch is controlled normally in accordance with a modulation reference by switching at a high frequency. According to this method, the maximum proportion of the conducting state of the switch may equal a third of the duration of the sine-wave half-cycle. The conducting state of the change-over contact in this method is disposed symmetrically on either side of the maximum voltage value, which occurs at the 90-degree electrical angle of the sine wave. Thus, the conducting state may begin at the 60-degree electrical angle and end at the 120-degree electrical angle. The problem with this method is that, since the conducting state is defined in relation to the fundamental wave of a phase voltage of the frequency converter, the maximum value of the phase current, due to a phase difference between the current and voltage of the motor, may occur in the change-over switch at an instant when the change-over switch is being switched at a high frequency. In this case the total losses in the change-over switch are greater than in a case where the change-over switch is held continuously in the conducting state always with a maximum current. If the frequency converter is to control a large current at a low frequency of the fundamental wave of the voltage and current, then the current will change at a slow rate, flowing continuously for a long time through the same change-over switch. If the current in this situation is distributed between the motor phases in such a way that a maximum current of about the same magnitude is flowing in two different phases, then according to this method at least one change-over switch is continuously switched with a maximum current. The power losses are therefore unequally distributed between the change-over switches and the switching change-over switch is heated most. In such a situation, the maximum current of the frequency converter is determined on the basis of the change-over switch that switches continuously for a long time. Such a situation may occur e.g. in an elevator drive when the elevator car is held immovable by the torque produced by the motor. In this case, the frequency of the current is low and a maximum current may flow for a long time through only one change-over switch.

Specification GB 2086102 A discloses a supply arrangement for a multi-phase motor drive, wherein one of the phases of the supply network is connected directly to a motor winding and two supply network phases are connected to two windings of the motor via controllable switching devices.

OBJECT OF THE INVENTION

The object of the present invention is to disclose a method that will make it possible to reduce the switching losses in the change-over switches of a frequency converter. A further object of the invention is to disclose an apparatus for controlling the change-over switches so as to reduce the switching losses.

FEATURES OF THE INVENTION

The method of the invention for controlling a frequency converter-driven, three-or-more-phase motor is characterized by what is disclosed in the characterizing part of claim 1. The apparatus of the invention for controlling a frequency converter-driven, three-or-more-phase motor is characterized by what is disclosed in the characterizing part of claim 8. Other features of the invention are characterized by what is disclosed in the other claims. Inventive embodiments are also presented in the description part of the present application. The inventive content disclosed in the application can also be defined in other ways than is done in the claims below. The inventive content may also consist of several separate inventions, especially if the invention is considered in the light of explicit or implicit subtasks or with respect to advantages or sets of advantages achieved. In this case, some of the attributes contained in the claims below may be superfluous from the point of view of separate inventive concepts.

In a method according to the invention for controlling a frequency converter-driven three-or-more-phase motor, the frequency converter comprises a number of change-over switches, of which at least one change-over switch for each motor phase. The change-over switches are fitted in the motor phases and comprise controllable change-over contacts. In the method, the magnitudes of the phase currents of the motor are determined; the change-over switch is controlled to a continuously conducting state in one motor phase at a time; the change-over switches in the other motor phases are switched at a switching frequency substantially higher than the frequency of the fundamental wave of the phase voltage or phase current; and the change-over switch of the phase with the highest absolute value of phase current or current reference is controlled to a continuously conducting state for a period of time during which the absolute values of phase current or current reference in the phase with the highest said absolute value and in the phase with the second highest said absolute value differ from each other by at least a predetermined limit value. 'Continuously conducting state' refers to a state in which the positive or negative change-over contact of the change-over switch conducts continuously for the period of time during which the change-over switch is continuously in the conducting state at a time. This period of time has a duration covering one or more switching periods in the control according to the modulation. During the continuously conducting state, no switching actions of the change-over switch can take place, so when either the positive or negative change-over contact has been turned to conduction at the beginning of the continuously conducting state, it also stays in conduction throughout the continuously conducting state. Further, 'control according to modulation' refers to a switching reference generated by a known modulation method, such as pulse width modulation or frequency modulation. In an embodiment according to the invention, the frequency converter comprises means for adjusting the phase current of the motor, as well as current references for each phase. In this case, the phase current of the motor is adjusted with the aim of making it correspond to the phase-current reference for the motor current. In a method according to the invention, only the change-over switch of the phase with the highest absolute value of current or phase-current reference is controlled to the continuously conducting state, whereas in another method according to the invention the change-over switch of the phase with the highest absolute value and the change-over switch of the phase with the next highest absolute value are alternately controlled to the continuously conducting state.

In a method according to the invention, the frequency converter comprises means for controlling the change-over contacts and possibly phase-current references.

In a method according to the invention, the change-over switch of the phase with alternatively the highest or the next highest absolute value of phase current or phase-current reference is controlled to the continuously conducting state and at the same time the change-over switches of the other phases are controlled with a switching reference generated by means of a pulse width modulator.

In a method according to the invention, the positive or negative change-over contact of the change-over switch of the phase with the highest absolute value of phase current or phase-current reference is turned to the continuously conducting state for the period of time during which the absolute values of phase current or current reference in the phase with the highest said absolute value and in the phase with the next highest said absolute value differ from each other by at least a predetermined limit value. Since the motor currents and current references are generally sinusoidal, the proportion of the current half-cycle comprised in the continuously conducting state in the change-over switch of the phase with the largest current is the larger the smaller the limit value is. In the present method according to the invention, the limit value may also have a zero value, in which case the change-over switch through which the largest current flows is always in the continuously conducting state during the largest current flow.

In a method according to the invention, the positive or negative change-over contact of the change-over switches of the phase with the highest absolute value of phase current or phase-current reference and of the phase with the next highest absolute value are alternately controlled to the continuously conducting state for predetermined periods of time when the absolute values of the currents or current references in the phase with the highest absolute value of phase current or phase-current reference and in the phase with the next highest corresponding absolute values differ from each other by less than a predetermined limit value, and at the same time the phase voltages or phase currents of the other phases are controlled by switching the change-over switches of the phases in question at a switching frequency substantially higher than the frequency of the fundamental wave of the phase voltage or phase current. In this method, the change-over switch of only one phase at a time can be in the continuously conducting state. The alternate continuously conducting states between the change-over switches of the two different phases may be equal in duration, or the durations may be defined separately for each phase. Further, in this embodiment of the invention the periods of time predefined for the continuously conducting states may vary in such manner that the continuously conducting state has alternately in either phase a duration corresponding to at least one switching cycle according to modulation. When one of the phases with the highest or next highest absolute value is in the continuously conducting state, the change-over switch in one of these phases is controlled by control according to modulation, switching at a given switching frequency.

In a method according to the invention, the change-over switch of the phase with the highest absolute value of the phase current or phase-current reference and the change-over switch of the phase with the next highest absolute value are alternately controlled to the continuously conducting state for a period of time varying according to the magnitude of the highest or next highest absolute value of phase current or phase-current reference. If in this method the duration of the continuously conducting state increases as the current or current reference increases, the switching losses also decrease with increasing current, and at the same time the power losses of the change-over switch are reduced.

In a method according to the invention, IGBT transistors are used as change-over switches. According to this method, the duration of the control signal of the modulation-controlled switches in the phases with the highest and the next highest absolute value of phase current or phase-current reference is set to be substantially shorter than a predetermined heating time constant of the semi-conductor of the IGBT transistor. 'Heating time constant' refers to the period of time in the course of which the temperature of the power semiconductor of the IGBT transistor rises to at least 64% of its final value when the heating of the IGBT transistor is started at a constant power rate of P. For IGBT transistors, this time constant is typically a few milliseconds. The final temperature of the semiconductor depends on the heating power. This power depends on the current flowing through the semiconductor and on the switching frequency. When high-frequency modulation-controlled switching in the phase with the largest or the next largest current is stopped before the power semiconductor has reached its final temperature, overheating of the semiconductor is effectively prevented. When the transistor stops switching at a high frequency and is turned into a continuously conducting state, its power losses are reduced and it begins to cool down.

In a method according to the invention, the positive change-over contact of the change-over switch of the phase to be held in the continuously conducting state is controlled to the continuously conducting state when the direction of the motor current or current reference in the phase in question is towards the motor.

In a method according to the invention, the negative change-over contact of the change-over switch of the phase to be held in the continuously conducting state is controlled to the continuously conducting state when the direction of the motor current or current reference in the phase in question is away from the motor.

In the method of the invention, the change-over switches of those phases which are not in the continuously conducting state are controlled using a switching reference generated via modulation. According to this method, the phase voltages or phase currents of these phases are controlled by switching the change-over switches of the phases in question at a switching frequency substantially higher than the frequency of the fundamental wave of the phase voltage or phase current. The switching frequency of the change-over switches is thus predetermined. In a method according to the invention, this switching frequency of the change-over switches equals at least five times the frequency of the fundamental wave of the motor current.

In a method according to the invention, the switching frequency of the change-over switches is reduced substantially when the control of the switches has been changed from a prior-art control scheme to a control scheme implemented by the method of the invention. In this case, the prior-art control scheme used is pulse width modulation, wherein the change-over switches are switched continuously at a predetermined switching frequency alternately to the positive and negative voltage potentials of the direct-voltage intermediate circuit of the frequency converter. Since in the method of the invention the change-over switch of the phase in the continuously conducting state is held at the same potential for the entire duration of the state, the switching-frequency voltage variation over the phase windings of the motor is substantially reduced when the method of the invention is applied. As in this case the switching-frequency variation of the current in the motor windings is substantially reduced as well, a switching-frequency current variation of equal amplitude can be achieved with a substantially lower switching frequency. This further reduces the switching losses.

An apparatus according to the invention for controlling a frequency converter-driven, three-or-more-phase motor comprises in conjunction with the frequency converter a number of change-over switches, of which at least one change-over switch for each motor phase. The change-over switches are fitted in the motor phases and comprise controllable change-over contacts. In addition, the apparatus further comprises in conjunction with the frequency converter at least means for determining the motor phase currents and means for controlling the change-over contacts. In this case, the apparatus for controlling a frequency converter-driven, three-or-more-phase motor also comprises means for determining the duration of a continuously conducting state of the change-over contact, said means comprising a limit value for the deviation between the highest and the second highest absolute value of current or current reference.

An apparatus according to the invention comprises phase-specific current references. In an apparatus according to the invention, the means for controlling the change-over switches comprise an element for determining an absolute value, a comparator, control of a continuously conducting state, and a modulator. In this case, the element for determining an absolute value is used to determine the absolute values of the phase currents of the motor. Using the comparator, the absolute values of the phase currents or phase-current references of the motor are compared to each other, and the phase with the largest current or current reference and possibly likewise the phase with the second largest current or current reference is determined. The data regarding the phases and the polarities and magnitudes of the phase currents determined by means of the comparator are delivered to a control stage controlling the continuously conducting state. Via the control stage controlling the continuously conducting state, the change-over switches to be switched to the continuously conducting state are determined. In addition, a choice is defined as to whether the positive or the negative change-over contact of the change-over switch is to be switched to the continuously conducting state.

An apparatus according to the invention comprises a pulse width modulator and means for generating a voltage reference for the phase voltage.

An apparatus according to the invention for controlling a frequency converter-driven, three-or-more-phase motor comprises means for determining the polarity of the phase current or phase-specific current reference, means for varying the switching frequency of the switching reference generated by the modulator, and means for determining the duration of the continuously conducting state of a change-over contact, and means for measuring the duration of said state. In a preferred embodiment of the invention, the modulator used is a pulse width modulator, in which case the means for determining the switching frequency of the switching reference comprise means for varying the frequency of the triangular wave of the modulator. The means for determining the duration of the continuously conducting state of the change-over contact comprise at least a memory in connection with the control of the continuously conducting state. The control of the continuously conducting state can be defined e.g. by the aid of the frequency of the triangular wave of the modulator in such manner that the duration of the state covers one or more cycles of the triangular wave. The means for determining the duration of the continuously conducting state may comprise means in conjunction with the motor phase for measuring the motor phase voltage and identifying a continuously conducting state on the basis of the measurement, and a timer for measuring the duration of the state identified.

Another apparatus according to the invention comprises means for determining the heating time constant of the semiconductor of an IGBT transistor. Said means may comprise e.g. a temperature sensor in the vicinity of the semi-conductor, in which case the heating of the semiconductor is measured during the switching actions of the semiconductor and a heating time constant for the semiconductor is estimated from the rate of change of the temperature.

The method or apparatus of the invention may also be applied to the control of an elevator motor. The elevator motor may be disposed either in an elevator shaft or in an elevator machine room. The elevator motor may be comprised in an elevator system with or without counterweight.

The invention may also be applied to a rotating electric motor in which a magnetic field crosses an air gap substantially in the direction of the axis of rotation, in which case the motor is a so-called axial-flux motor, or the magnetic field may cross the air gap substantially in the direction of the radius of the motor, perpendicularly to the axis of rotation, in which case the motor is a radial-flux motor. Furthermore, the invention may also be applied to the control of a linear motor.

It is obvious to a person skilled in the art that control according to the invention may also be applied to systems other than elevator systems, such as e.g. in conjunction with crane systems.

ADVANTAGES OF THE INVENTION

By applying the method of the invention, it is possible to reduce the switching losses of a change-over switch. As the change-over switch conducting the largest current is turned to the continuously conducting state, the losses occurring in the change-over switch in this situation consist of conduction losses only. Therefore, the switching elements are not heated as much as in the case where they are switched at a high switching frequency as in prior art.

The method of the invention also makes it possible to reduce the harmonics of the current in the DC intermediate circuit of the frequency converter. This is based on the fact that, in the method of the invention, the direction of the intermediate circuit current in the continuously conducting change-over switch mostly remains unchanged during the entire continuously conducting state, and thus the current is not passed to the intermediate circuit in switching-frequency pulses as in the case of e.g. prior-art control by pulse width modulation.

When the phase switches of the motor are controlled by the method of the invention, switching-frequency harmonics of the voltage across the phase windings of the motor are reduced because the change-over switch of the phase in the continuously conducting state is not switched at the switching frequency to the positive and negative voltage potentials of the DC intermediate circuit of the frequency converter. This also reduces the switching-frequency harmonics of the motor current. If the control of the current is to be designed for predetermined switching-frequency current harmonics, the switching frequency in the control according to this method can be reduced, thus allowing current harmonics of equal amplitude to be achieved with a lower switching frequency and at the same time with smaller power losses.

Thus, power losses in the switching elements can be reduced by this method. In modern frequency converters, the switching elements used are generally IGBT transistors, which make up the largest individual proportion of the price of a frequency converter. A frequency converter controlled by this method can thus be designed for larger motor currents, the power/price ratio of the frequency converter being thereby improved.

EMBODIMENT EXAMPLES

In the embodiment examples described, the invention is applied in conjunction with a three-phase electric motor, but an elevator motor according to the invention may also comprise more than three phases. However, a three-phase motor has the advantage that the phase windings of the motor can be connected to the star point without having to couple a separate conductor to the star point for zero current. In the embodiment examples, IGBT transistors are used as change-over switches, but the change-over switches may also be semiconductor switches implemented in other ways, such as thyristors, or mechanical switches, such as relays.

Figure 1:
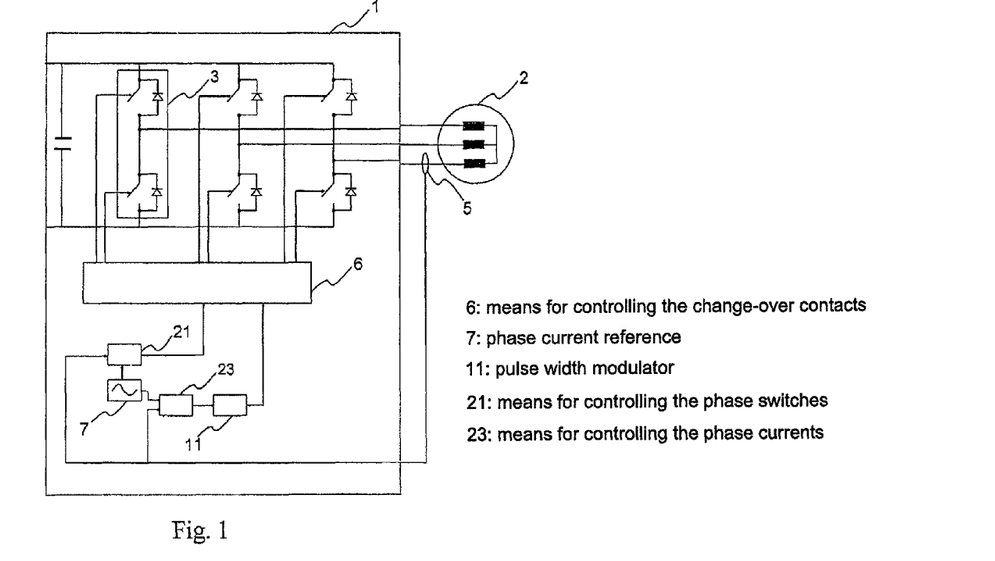
FIG. 1 represents an apparatus according to the invention
Figure 2:
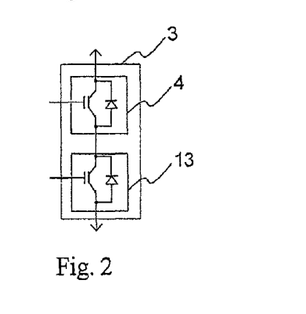
FIG. 2 represents a change-over switch in the apparatus of the invention

FIG. 1 represents an apparatus according to the invention for controlling a motor. The motor 2 is controlled by means of a frequency converter 1. The apparatus comprises means for measuring 5 the phase current of the motor. All the phase currents of the motor are measured. The apparatus according to the present invention additionally comprises means for controlling 23 the phase currents in all motor phases, in which connection the measured phase current is compared to a current reference 7, producing as an output a phase voltage reference, which is varied so as to cause the current to change to a value corresponding to the current reference. The phase voltage is passed to a pulse width modulator 11, where modulation is performed by comparing the phase voltage to a triangular wave. The modulator output is passed to means for controlling 6 the change-over contacts, and the change-over contacts are controlled by the control signal produced by the modulator. In this embodiment example according to the invention, the phase currents of those phases are controlled in which the change-over switch is not in a continuously conducting state. The motor phase voltage or phase current is can also be controlled in the phase which is in the continuously conducting state by controlling the phase voltages or phase currents of the phases other than the phase in the continuously conducting state. This is because the potential at the star point of the motor may change as the phase voltages in the phases other the phase in a continuously conducting state change, because in this situation there appears across the motor phase winding of the phase in the continuously conducting state a voltage difference, which changes as the phase voltages in the phases not in a continuously conducting state change. Further, if the motor windings are connected in a star configuration, then the magnitude of the current in the phase in the continuously conducting state can be determined via the other phases, because, according to the well-known Kirchoffs current law, the sum of the currents in all motor phases connected in star equals zero.

The motor phase current and phase-current reference 7 are passed to means 21 for controlling the phase switches. These means comprise an element 18 for determining the absolute value, a comparator 19 and a control stage 20 controlling the continuously conducting state. In the element 18 for determining the absolute value, the absolute values of all phase currents and phase-current references are determined. The comparator 19 is used to determine those phases in which the phase currents have the highest and the next highest absolute values. The data regarding the phases thus determined is passed to the control stage 20 controlling the continuously conducting state. From the output of the control stage controlling the continuously conducting state is obtained control data indicating those phases in which the positive 4 or negative 13 change-over contacts of the change-over switches are to be controlled into a continuously conducting state 12. This data is transmitted to means 6 for controlling the change-over contacts. The change-over contact to be controlled in the continuously conducting state is selected in accordance with the following logic:

the positive change-over contact 4 of the change-over switch is controlled to the continuously conducting state when the direction of the motor current or phase-current reference is towards the motor the negative change-over contact 13 of the change-over switch is controlled to the continuously conducting state when the direction of the motor current or phase-current reference is away from the motor.

The control of switching the change-over contact to the continuously conducting state 12, 24 can be implemented using either the phase current or the phase-current reference. If the values of the phase current and phase-current reference differ considerably from each other, e.g. when the current reference changes abruptly upon a change of the speed regulator output, it is advisable to implement the control of the continuously conducting state on the basis of the current reference, because in this case the system will control the change-over switches in such manner that the change-over switch to be controlled to the continuously conducting state is the switch of that phase which can provide the best phase voltage for adjusting the current so as to make it correspond to the current reference. A disadvantage in this case is that the phase thus selected to be switched to the continuously conducting state is not necessarily the phase with the highest phase current value, which increases the power losses of the IGBT transistors.

Figure 3:
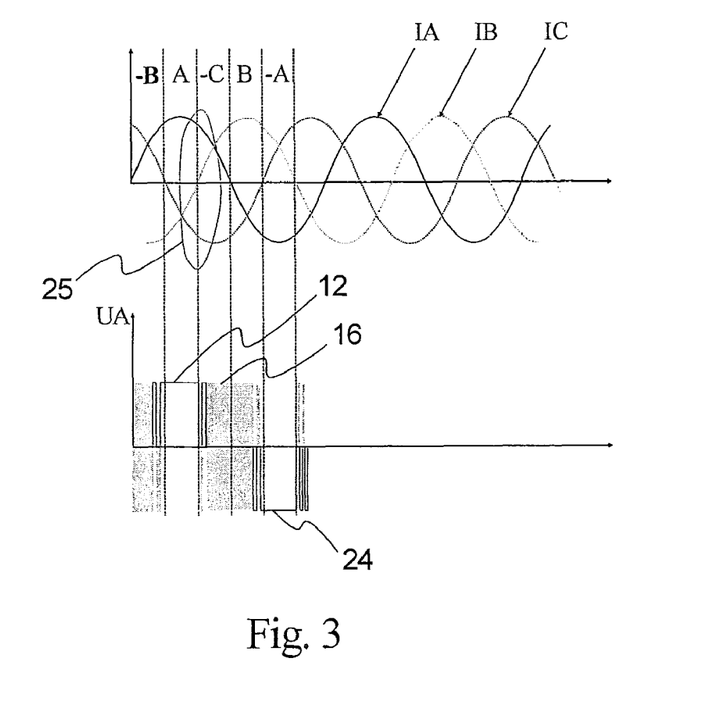
FIG. 3 shows graphs of motor phase voltage and phase current or phase-current reference in a situation where an apparatus according to the invention is controlled by a method according to the invention

FIG. 3 presents graphs representing the phase voltage and phase current of the motor in a situation where the apparatus of the invention is controlled by the method of the invention. In the figure, the motor phases are designated by identifiers A, B and C, and the corresponding phase currents are designated by identifiers IA, IB and IC. The identifiers of the corresponding phase voltages are UA, UB and UC. In a situation where the positive phase current IA is largest, the positive change-over contact 4 of phase A is in a continuously conducting state 12. Positive direction of the phase current means that the direction of the phase current of the motor is towards the motor. In a situation where the negative phase current IA is largest, the negative change-over contact 13 of phase A is in a continuously conducting state 24 and the direction of the motor phase current is away from the motor. Instead of the phase current, it is also possible in this method to use the phase-current reference, and in the case of FIG. 3 positive current reference means that the current is set to flow towards the motor. When the change-over switch of phase A is in a state other than the continuously conducting state, the switch is switched at a high frequency in accordance with the modulation reference. In FIG. 3, this state 16 is represented by the area colored gray.

Figure 4:
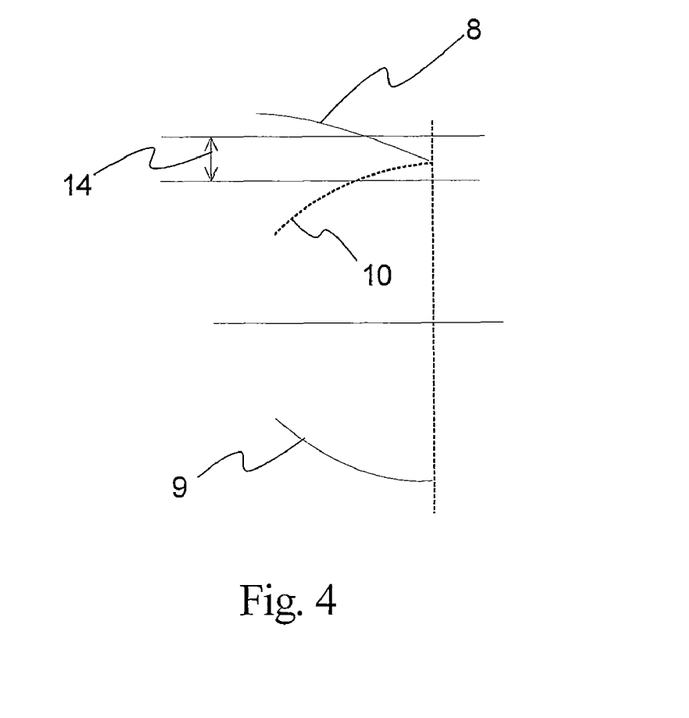
FIG. 4 shows a detail of the phase current or phase-current reference illustrated in FIG. 3.

FIG. 4 presents the detail 25 indicated in FIG. 3, representing the motor phase current. The figure shows the highest current value 8 in phase A, the next highest value 9 in phase C and the absolute value 10 of current 9. When the highest value 8 and the next highest value 9 of phase current or phase-current reference as absolute values differ from each other by at least a predetermined limit value 14, the positive change-over contact of phase A is in the continuously conducting state. When the absolute values of the currents differ from each other by less than the limit value 14, the positive change-over contact of phase A and the negative change-over contact of phase C are alternately controlled to the continuously conducting state for predetermined periods of time 15. In the case of phase A, the positive change-over contact is selected because in the situation of FIG. 4 the current in that phase is towards the motor. In the case of phase C, the negative change-over contact is selected because the direction of the current in that phase is away from the motor.

Figure 5:
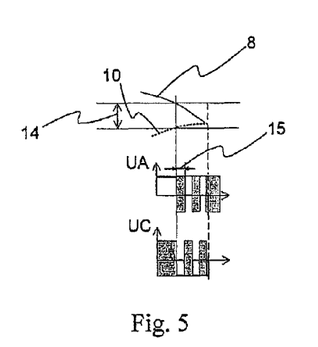
FIG. 5 shows a detail of the phase current or phase-current reference illustrated in FIG. 3.

FIG. 5 further illustrates the detail 25 indicated in FIG. 3. When the positive change-over contact of phase A and the negative change-over contact of phase C are alternately controlled to the continuously conducting state, a phase voltage graphs as shown in FIG. 5 is produced. In this way, the losses of the IGBT transistor are more equally distributed in phases A and C than if e.g. the change-over switch of phase A were continuously in the conducting state and the change-over switch of phase C switched continuously at a high frequency.

Figure 6:
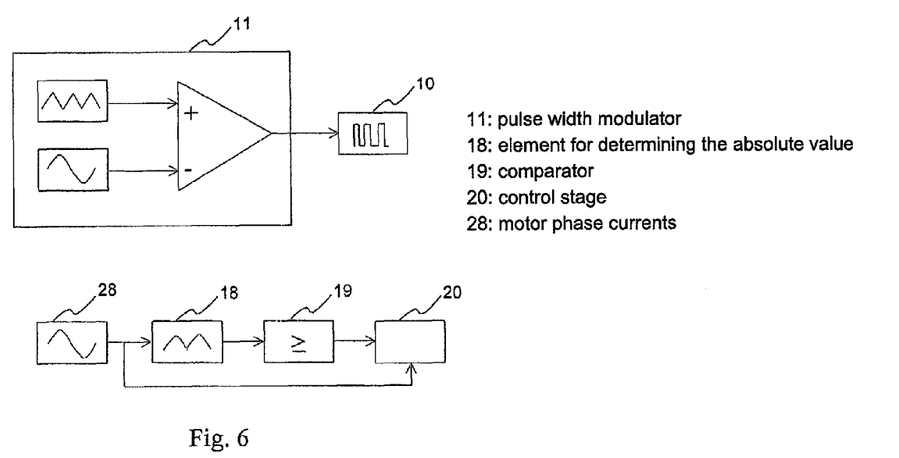
FIG. 6 represents a modulator according to the invention and illustrates how the continuously conducting state is controlled according to the invention

FIG. 6 illustrates the structure of a pulse width modulator according to the invention and the control of the continuously conducting state of a change-over switch according to the invention. The pulse width modulator 11 consists of a control signal, a triangular wave generator and a selector for selecting a highest value. When the control voltage has an instantaneous value lower than the value of the triangular wave, the modulator output is in the logic state '1'. When the control voltage has an instantaneous value higher than that of the triangular wave, the modulator output produces the logic state '0'. Thus, the modulator produces at its output a pulse pattern whose frequency corresponds to the frequency of the triangular wave. In this situation the change-over switch also switches at a switching frequency corresponding to the triangular wave frequency. FIG. 6 also illustrates the way in which, by using the motor phase currents 28, the control of the change-over switches of the frequency converter is forced into the continuously conducting state. In this preferred embodiment of the invention, the measured motor phase currents 28 are passed to an element 18 for determining the absolute value, by means of which the absolute values of all the phase currents of the motor are determined. After this, the currents are passed to a comparator 19. By means of the comparator, the motor phase currents are compared to each other and the phases carrying the largest and the next largest currents at the instant of the determination are established. Next, the information regarding the phases determined by the comparator is passed to the control stage 20 controlling the continuously conducting state. In addition, data regarding the polarity of the measured current 28 is passed to the control stage. Constructed in the control stage 20 controlling the continuously conducting state is an inference logic which uses the method described in the invention. Using the inference logic, the control stage controlling the continuously conducting state determines the change-over switches to be controlled to the continuously conducting state and also determines whether the positive or the negative change-over contact of the change-over switch is to be used in the control.

Figure 7:
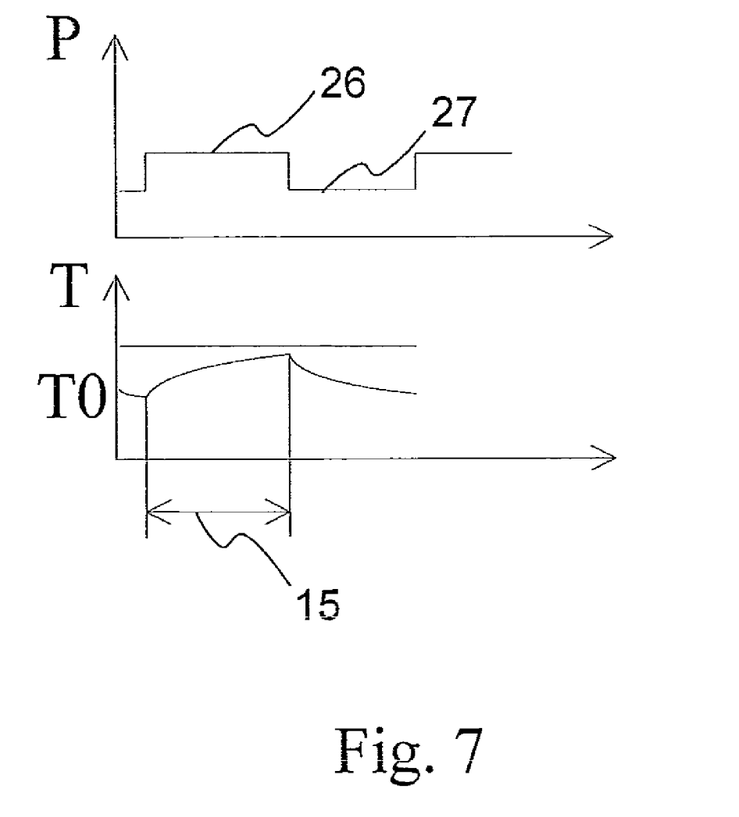
FIG. 7 presents graphs representing the temperature and power loss of the semiconductor of an IGBT transistor as functions of time.

FIG. 7 presents graphs representing the temperature T and power dissipation P of the IGBT transistor in the change-over switch of phase A as functions of time in a situation where the change-over switches of phase A and phase C are alternately switched to the continuously conducting state for predetermined periods 15 of time. Graph portion 26 represents power dissipation in the change-over switch of phase A when the change-over switch is switching at a high switching frequency in accordance with the modulation reference. Graph portion 27 represents power dissipation in the change-over switch of phase A in the continuously conducting state. When the switch is in the continuously conducting state 27, the losses occurring in it consist of conduction losses only. When the switch is switching continuously at a high switching frequency in state 26, the losses occurring in the switch increase, consisting of conduction losses and switching losses. FIG. 7 also visualizes the temperature of the IGBT transistor in situations 26 and 27. When the transistor is switching, it is heated with a given heating time constant towards its constant-state temperature TO. When the transistor is turned to the continuously conducting state, its power losses 27 are reduced and the transistor starts cooling down. When the continuous duration of the continuously conducting state in the change-over switch is shorter than the heating time constant of the transistor, heating will not occur fast enough for the transistor to reach its constant-state temperature TO, and thus overheating of the transistor is avoided.

The invention has been described above with reference to a few embodiment examples. It is obvious to a person skilled in the art that the invention is not exclusively limited to the embodiments described above, but that many other embodiments are possible within the scope of the inventive concept defined in the claims.

The invention claimed is:

1. A method for controlling a three-or-more-phase motor driven by a frequency converter, the frequency converter comprising a number of change-over switches, of which at least one change-over switch for each motor phase, the change-over switches being fitted in the motor phases and comprising controllable change-over contacts, the method comprising:
   determining magnitudes of phase currents of the motor;
   controlling the change-over switch to a continuously conducting state in one motor phase at a time;
   switching the change-over switches in the other motor phases at a switching frequency substantially higher than a frequency of a fundamental wave of a phase voltage or the phase current; and
   controlling the change-over switch of the motor phase with a highest absolute value of the phase current or a phase current reference to a continuously conducting state for a period of time during which the absolute values of the phase current or the phase current reference in the phases with the highest and a next highest absolute values of the phase current or the phase current reference differ from each other by at least a predetermined limit value.

2. The method according to claim 1, further comprising:
   controlling the change-over switch of the phase with the highest or the next highest absolute value of alternatively phase current or phase current reference to the continuously conducting state while at the same time controlling the change-over switches of the other phases with a switching reference generated by a pulse width modulator.

3. The method according to claim 1, further comprising:
   controlling a positive or negative change-over contact of the change-over switches of the phase with the highest absolute value of the phase current or the phase current reference and of the phase with the next highest said absolute value alternately to the continuously conducting state for predetermined periods of time when the absolute values of the phase currents or the phase current references of the phase with the highest absolute value of the phase current or the phase current reference and of the phase with the next highest said absolute values differ from each other by less than a predetermined limit value while at the same time controlling the phase voltages or the phase currents of the other phases by switching the change-over switches of the phases in question at a switching frequency substantially higher than the frequency of the fundamental wave of the phase voltage or the phase current.

4. The method according to claim 3, further comprising:
   controlling the change-over switch of the phase with the highest absolute value of the phase current or the phase current reference and the change-over switch of the phase with the next highest absolute value alternately to the continuously conducting state for a period of time varying according to a magnitude of the highest or the next highest absolute value of the phase current or the phase current reference.

5. The method according to claim 1, wherein the change-over switches used in the method are IGBT transistors, the method further comprising:
   setting a duration of control according to the modulation in the phases with the highest and the next highest absolute values of the phase current or the phase current reference to be substantially shorter than a predetermined heating time constant of a semiconductor of the IGBT transistor.

6. The method according to claim 1, further comprising:
   controlling the positive change-over contact of the phase change-over switch designated to be set to the continuously conducting state to the continuously conducting state when a direction of the motor current or current reference in the phase in question is towards the motor; and
   controlling the negative change-over contact of the phase change-over switch designated to be set to the continuously conducting state to the continuously conducting state when a direction of the phase current or the phase current reference in the phase in question is away from the motor.

7. The method according to claim 1, wherein the motor is an elevator motor.

8. The method according to claim 2, further comprising:
   controlling a positive or negative change-over contact of the change-over switches of the phase with the highest absolute value of the phase current or the phase current reference and of the phase with the next highest said absolute value alternately to the continuously conducting state for predetermined periods of time when the absolute values of the phase currents or the phase current references of the phase with the highest absolute value of the phase current or the phase current reference and of the phase with the next highest said absolute values differ from each other by less than a predetermined limit value while at the same time controlling the phase voltages or the phase currents of the other phases by switching the change-over switches of the phases in question at a switching frequency substantially higher than the frequency of the fundamental wave of the phase voltage or the phase current.

9. The method according to claim 2, wherein the change-over switches used in the method are IGBT transistors, and the method further comprising:

setting a duration of control according to modulation in the phases with the highest and the next highest absolute values of the phase current or the phase current reference to be substantially shorter than a predetermined heating time constant of a semiconductor of the IGBT transistor.

10. The method according to claim 3, wherein the change-over switches used in the method are IGBT transistors, the method further comprising:

setting a duration of control according to in the phases with the highest and the next highest absolute value values of the phase current or the phase current reference to be substantially shorter than a predetermined heating time constant of a semiconductor of the IGBT transistor.

11. The method according to claim 4, wherein the change-over switches used in the method are IGBT transistors, the method further comprising:

setting a duration of control according to modulation in the phases with the highest and the next highest absolute values of the phase current or the phase current reference to be substantially shorter than a predetermined heating time constant of a semiconductor of the IGBT transistor.

12. The method according to claim 2, further comprising:
controlling the positive change-over contact of the phase change-over switch designated to be set to the continuously conducting state to the continuously conducting state when a direction of the motor current or current reference in the phase in question is towards the motor; and
controlling the negative change-over contact of the phase change-over switch designated to be set to the continuously conducting state to the continuously conducting state when a direction of the phase current or the phase current reference in the phase in question is away from the motor.

13. The method according to claim 3, further comprising:
controlling the positive change-over contact of the phase change-over switch designated to be set to the continuously conducting state to the continuously conducting state when a direction of the motor current or current reference in the phase in question is towards the motor; and
controlling the negative change-over contact of the phase change-over switch designated to be set to the continuously conducting state to the continuously conducting state when a direction of the phase current or the phase current reference in the phase in question is away from the motor.

14. The method according to claim 4, further comprising:
controlling the positive change-over contact of the phase change-over switch designated to be set to the continuously conducting state to the continuously conducting state when a direction of the motor current or current reference in the phase in question is towards the motor; and
controlling the negative change-over contact of the phase change-over switch designated to be set to the continuously conducting state to the continuously conducting state when a direction of the phase current or the phase current reference in the phase in question is away from the motor.

15. The method according to claim 5, further comprising:
controlling the positive change-over contact of the phase change-over switch designated to be set to the continuously conducting state to the continuously conducting state when a direction of the motor current or current reference in the phase in question is towards the motor; and
controlling the negative change-over contact of the phase change-over switch designated to be set to the continuously conducting state to the continuously conducting state when a direction of the phase current or the phase current reference in the phase in question is away from the motor.

16. An apparatus for controlling a three-or-more-phase motor driven by a frequency converter, said apparatus comprising;
a number of change-over switches in conjunction with the frequency converter, of which at least one change-over switch for each motor phase, the change-over switches being fitted in the motor phases and comprising controllable change-over contacts;
means for determining the motor phase currents in conjunction with the frequency converter;
means for controlling the change-over contacts;
means for determining a duration of a continuously conducting state of a change-over contact, said means comprising a limit value for a deviation between a highest and a second highest absolute values of current or current reference.

17. The apparatus according to claim 16, further comprising a pulse width modulator and means for generating a phase voltage reference.

18. The apparatus according to claim 16, further comprising means for determining a heating time constant of a semiconductor of an IGBT transistor.

19. The apparatus according to claim 17, further comprising means for determining a heating time constant of a semiconductor of an IGBT transistor.

20. The apparatus according to claim 16, wherein the motor is an elevator motor.

* * * * *